US009249811B2

(12) United States Patent
Jiang

(10) Patent No.: US 9,249,811 B2
(45) Date of Patent: Feb. 2, 2016

(54) COMPRESSED AIR ENERGY STORAGE SYSTEM AND METHOD

(71) Applicant: North China Electric Power University, Beijing (CN)

(72) Inventor: Tong Jiang, Beijing (CN)

(73) Assignee: North China Electric Power University, Beijing (CN)

( * ) Notice: Subject to any disclaimer, the term of this patent is extended or adjusted under 35 U.S.C. 154(b) by 363 days.

(21) Appl. No.: 13/791,364

(22) Filed: Mar. 8, 2013

(65) Prior Publication Data
US 2014/0216022 A1    Aug. 7, 2014

(51) Int. Cl.
*F15B 1/04* (2006.01)
*F03B 13/06* (2006.01)
*F02C 6/16* (2006.01)
*H02J 15/00* (2006.01)

(52) U.S. Cl.
CPC ... *F15B 1/04* (2013.01); *F02C 6/16* (2013.01); *F03B 13/06* (2013.01); *H02J 15/00* (2013.01); *H02J 15/006* (2013.01); *Y02E 60/15* (2013.01)

(58) Field of Classification Search
CPC .............. Y02E 60/15; F15B 1/04; E02B 9/00
USPC ............................................................ 60/398
See application file for complete search history.

(56) References Cited

U.S. PATENT DOCUMENTS

| | | | | |
|---|---|---|---|---|
| 3,677,008 A * | 7/1972 | Koutz | ............................... | 60/650 |
| 4,182,128 A * | 1/1980 | Gardner | ........................... | 60/652 |
| 4,206,608 A * | 6/1980 | Bell | ................................ | 60/698 |
| 4,691,524 A * | 9/1987 | Holscher | ........................... | 60/652 |
| 7,281,371 B1 * | 10/2007 | Heidenreich | ..................... | 60/398 |
| 7,579,700 B1 * | 8/2009 | Meller | ............................. | 290/43 |
| 7,743,609 B1 * | 6/2010 | Brostmeyer | ...................... | 60/398 |
| 7,900,444 B1 * | 3/2011 | McBride et al. | ................. | 60/410 |
| 7,952,219 B2 * | 5/2011 | Riley | .............................. | 290/54 |
| 8,046,990 B2 * | 11/2011 | Bollinger et al. | ................ | 60/410 |
| 8,522,538 B2 * | 9/2013 | Ingersoll et al. | ................ | 60/371 |
| 2005/0279085 A1 * | 12/2005 | Moore et al. | ..................... | 60/398 |
| 2012/0057997 A1 | 3/2012 | Blieske | | |

* cited by examiner

*Primary Examiner* — Thomas E Lazo
(74) *Attorney, Agent, or Firm* — Slater & Matsil, L.L.P.

(57) ABSTRACT

A compressed air energy storage system comprises a high-pressure water apparatus, a low-pressure water apparatus coupled to the high-pressure water apparatus through two channels, wherein a first channel is formed by a pumped hydroelectric power generation unit, a first high-pressure pipe and a first low-pressure pipe and a second channel is formed by a gas-water energy exchange unit, a second high-pressure pipe and a second low-pressure pipe and a compressed gas storage unit coupled to the gas-water energy exchange unit.

19 Claims, 16 Drawing Sheets

COMPRESSED AIR ENERGY STORAGE SYSTEM AND METHOD

This application claims priority to Chinese Application No. 201360424358, filed on Feb. 1, 2013, which is incorporated herein by reference in its entirety.

BACKGROUND

A power system may comprise a variety of power sources, transmission lines, distribution centers and loads. The power sources, transmission lines, distribution centers and loads form a network, which is commonly known as the grid. The power sources are used to generate electric power. The power sources may be power generators utilize different technologies such as solar energy sources (e.g., solar panels), wind generators (e.g., wind turbines), combined heat and power (CHP) systems, marine energy, geothermal, biomass, fuel cells, micro-turbines and/or the like.

Power demand in a power system may vary within one day. The demand may peak during daytime and early evening hours and drop dramatically during the night. On the other hand, due to the nature of renewable energy, the outputs of some power sources such as solar panels and wind turbines may vary considerably depending on uncontrollable natural factors such as wind strength and/or the like.

In order to provide reliable and stable power to critical loads, the power system may include a plurality of power storage units such as utility-scale energy storage systems, batteries and/or the like. The power storage units are designed so as to be capable of converting excess capacity into stored energy during off-peak hours and recovering the stored energy and converting it back to electricity during peak hours.

The energy storage units may be implemented as a rechargeable battery system, a compressed air energy storage system, a pumped storage hydroelectric system and/or the like. In a pumped storage hydroelectric system, during off-peak hours, the power generated by the power sources is greater than the power demand of the power system. The excess power may be utilized to pump water from a lower reservoir into an elevated reservoir. As such, excess electric energy is converted into potential energy and stored in the elevated reservoir. During peak hours, the water in the elevated reservoir is released to drive a water turbine. The water turbine is coupled to an electric generator, which converts potential energy back to electricity.

In a compressed air energy storage system, a motor driven compressor may compress atmospheric air into a storage container such as a tank, a cavern and/or the like during off-peak hours. As such, electric power is converted into pressure potential energy. On the other hand, during peak hours, the compressed air expands within an expansion apparatus in which the expanded air drives a mechanical component such as a shaft, which converts a reciprocating motion into a rotary motion. Such a rotary motion may be used to drive a power generator to generate electric power.

SUMMARY OF THE INVENTION

These and other problems are generally solved or circumvented, and technical advantages are generally achieved, by preferred embodiments of the present invention which provide a system for storing energy in a compressed air storage unit through a buffer stage formed by a high-pressure water apparatus and a low-pressure water apparatus.

In accordance with an embodiment, a system comprises a high-pressure liquid apparatus, a low-pressure liquid apparatus coupled to the high-pressure liquid apparatus through two channels, wherein a first channel is formed by a pumped hydroelectric power generation unit, a first high-pressure pipe and a first low-pressure pipe and a second channel is formed by a gas-water energy exchange unit, a second high-pressure pipe and a second low-pressure pipe and a compressed gas storage unit coupled to the gas-water energy exchange unit.

In accordance with another embodiment, a system comprises a compressed gas energy storage unit, a first energy conversion unit coupled to the compressed gas energy storage unit, a second energy conversion unit coupled to a power utility grid and a buffer stage coupled between the first energy conversion unit and the second energy conversion unit, wherein the buffer stage comprises a high-pressure water apparatus and a low-pressure water apparatus.

In accordance with yet another embodiment, a method comprises during an energy storage phase, pumping water from a low-pressure water apparatus to a high-pressure water apparatus through a pumped hydroelectric power generation unit and compressing air into a compressed gas storage unit through a gas-water energy exchange unit, wherein water flows from the high-pressure water apparatus to the low-pressure water apparatus.

The method further comprises during an energy release phase, pumping water from the low-pressure water apparatus to the high-pressure water apparatus through the gas-water energy exchange unit and converting potential energy of the high-pressure water apparatus into electric power through the pumped hydroelectric power generation unit, wherein water flows from the high-pressure water apparatus to the low-pressure water apparatus.

An advantage of an embodiment of the present invention is that the energy storage capacity of the system having a buffer stage is proportional to the potential energy of the compressed air storage unit rather than the buffer stage formed by the high-pressure water apparatus and the low-pressure water apparatus. As a result, the energy storage system is suitable for storing excess capacity in regions lacking of water resources.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments of the disclosure, and do not limit the scope of the disclosure.

The present disclosure will be described with respect to embodiments in a specific context, a compressed air energy storage system coupled to a power utility grid. The embodiments of the disclosure may also be applied, however, to a variety of energy storage systems. Hereinafter, various embodiments will be explained in detail with reference to the accompanying drawings.

Figure 1:
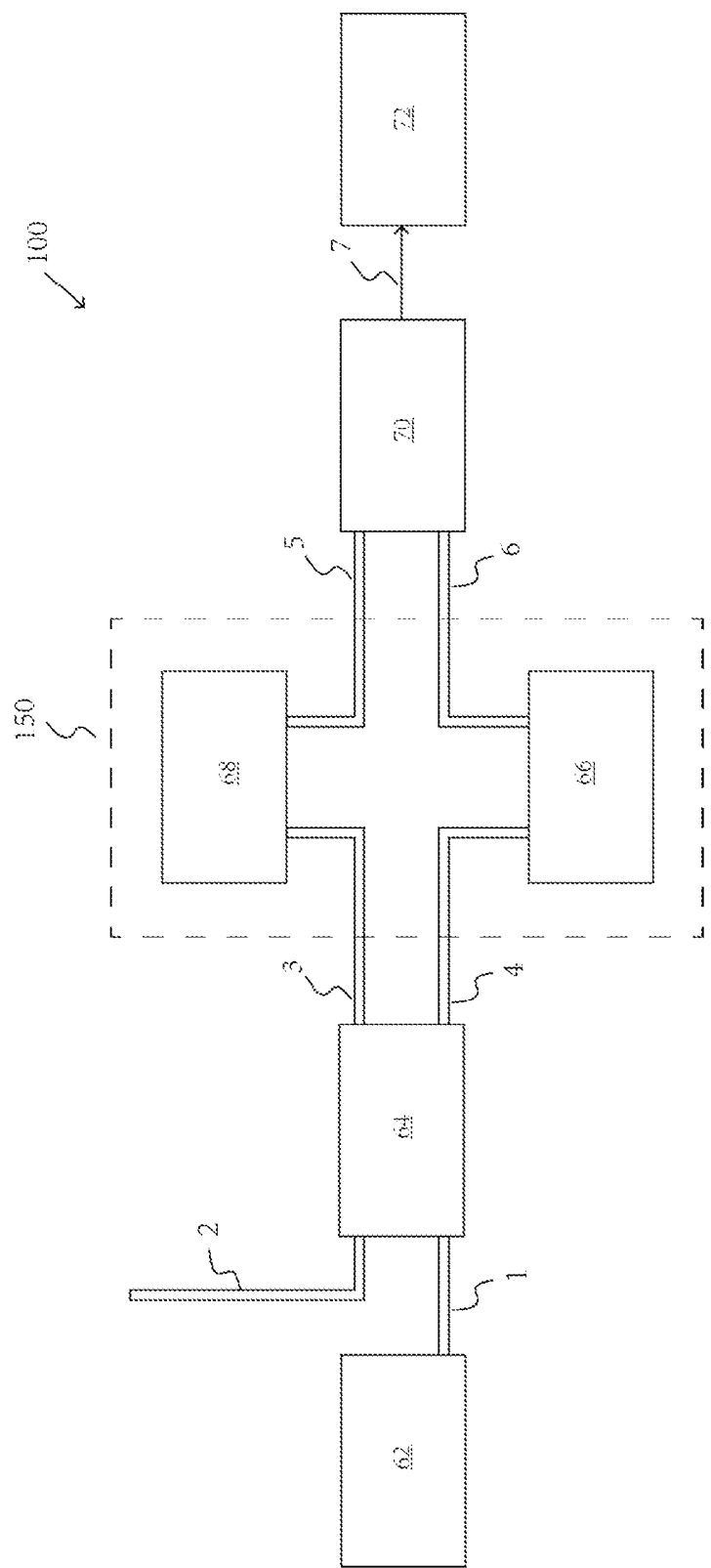
FIG. 1 illustrates a block diagram of an energy storage system in accordance with various embodiments of the present disclosure.

FIG. 1 illustrates a block diagram of an energy storage system in accordance with various embodiments of the present disclosure. The energy storage system 100 comprises a pumped hydroelectric power generation unit 70, a low-pressure water apparatus 66, a high-pressure water apparatus 68, a gas-water energy exchange unit 64 and a compressed air storage unit 62. In accordance with some embodiments, the energy storage system 100 may be utilized to store electric power energy generated by renewable energy sources such as winding, solar energy and/or the like.

As shown in FIG. 1, the energy storage system 100 is coupled to a power utility grid 72 through an electrical port 7. The compressed air storage unit 62 is coupled to the gas-water energy exchange unit 64 through a high-pressure gas pipe 1. In order to supply air for an air compression process, the gas-water energy exchange unit 64 is further coupled to the atmosphere through a low-pressure gas pipe 2. The energy storage system 100 may take in air from the ambient atmosphere for compression and vent air back to the ambient after expansion through the low-pressure gas pipe 2.

It should be noted that the configuration of the pipes (e.g., high-pressure gas pipe 1 and low-pressure gas pipe 2) described above is merely an example. A person skilled in the art will recognize there may be many variations, modifications and alternatives. For example, the low-pressure gas pipe 2 may be connected to a low-pressure gas tank rather than the ambient atmosphere.

As shown in FIG. 1, the high-pressure water apparatus 68 is coupled to the gas-water energy exchange unit 64 and the pumped hydroelectric power generation unit 70 through a first high-pressure water pipe 3 and a second high-pressure water pipe 5 respectively. Likewise, the low-pressure water apparatus 66 is coupled to the gas-water energy exchange unit 64 and the pumped hydroelectric power generation unit 70 through a first low-pressure water pipe 4 and a second low-pressure water pipe 6 respectively.

In some embodiments, the gas-water energy exchange unit 64 and the pumped hydroelectric power generation unit 70 may function as two energy conversion units coupled between the power utility grid 72 and the compressed air storage unit 62. The low-pressure water apparatus 66 and the high-pressure water apparatus 68 form a buffer stage 150 coupled between these two energy conversion units. The advantages of having the buffer stage 150 will be described below with respect to FIG. 2 and FIG. 3.

The pumped hydroelectric power generation unit 70 may comprise a water pump, a water turbine and a power generator (not shown respectively). The water pump is coupled between the low-pressure water apparatus 66 and the high-pressure water apparatus 68. The water pump is capable of pumping water from the low-pressure water apparatus 66 to the high-pressure water apparatus 68. The water turbine may be driven by the water falling form the high-pressure water apparatus 68 to the low-pressure water apparatus 66. The potential energy of the high-pressure water apparatus 68 may be converted into electric power through the power generator coupled to the water turbine.

It should be noted that the implementation of the pumped hydroelectric power generation unit 70 described above is merely an example. A person skilled in the art will recognize many alternatives, modifications and variations. For example, the pumped hydroelectric power generation unit 70 may include a reversible hydroelectric turbine. In a power generation phase, the reversible hydroelectric turbine operates as a turbine power generator. On the other hand, in an energy storage phase, the reversible hydroelectric turbine may function as a pump driven by an electric motor. The operating principles of reversible hydroelectric turbines are well known in the art, and hence are not discussed in further detail to avoid unnecessary repetition.

The high-pressure water apparatus 68 may be an air-water mixing tank. In some embodiments, the air-water mixing tank may be of a high initial pressure such as 3 megapascals. Alternatively, the high-pressure water apparatus 68 may be an upstream reservoir or an elevated water tank. In some embodiments, the high-pressure water apparatus 68 is implemented as an upstream reservoir. The difference in elevation between the upstream reservoir and the lower reservoir is about 300 m. The detailed structure of the high-pressure water apparatus 68 will be described below with respect to FIGS. 4-11.

The low-pressure water apparatus 66 may be a surface reservoir. The low-pressure water apparatus 66 is of a lower pressure in comparison with the high-pressure water apparatus 68. In some embodiments, the low-pressure water apparatus 66 is of a pressure approximately equal to the atmospheric pressure. In response to different implementation mechanisms of the high-pressure water apparatus 68, the implementation of the low-pressure water apparatus 66 may vary accordingly. However, the pressure difference generated by the high-pressure water apparatus 68 and the low-pressure water apparatus 66 may be stable. Such a stable pressure difference helps to achieve a higher efficiency at the pumped hydroelectric power generation unit. The detailed structure of the low-pressure water apparatus 66 will be described below with respect to FIGS. 4-11.

It should be noted that while the names of apparatuses 66 and 68 include "water," the low-pressure water apparatus 66 and the high-pressure water apparatus 68 may include other fluids (e.g., liquids) such as organic solvents and/or the like. Throughout the description, the low-pressure water apparatus 66 and the high-pressure water apparatus 68 may be alternatively referred to as a low-pressure liquid apparatus 66 and the high-pressure liquid apparatus 68 respectively.

The compressed air storage unit 62 is employed to store compressed air. The mass of the compressed air represents the amount of energy stored in the compressed air storage unit 62. In some embodiments, the compressed air is generated by the gas-water energy exchange unit 64. One exemplary embodiment of the gas-water energy exchange unit 64 will be described below with respect to FIG. 12. In alternative embodiments, the compressed air may be compressed by a motor driven compressor during off-peak hours.

In accordance with some embodiments, the compressed air storage unit 62 may be implemented as a storage container such as a tank, a naturally occurring or artificially created cavern and/or the like.

The gas-water energy exchange unit 64 is employed to convert potential energy between the compressed air storage unit 62 and the buffer stage 150 formed by the high-pressure water apparatus 68 and the low-pressure water apparatus 66. In particular, during off-peak hours of the power utility grid 72, the excess energy of the power utility grid 72 is used to pump the water from the low-pressure water apparatus 66 into the high-pressure water apparatus 68. At the same time, through the gas-water energy exchange unit 64, the potential energy of the water is converted into the potential energy of compressed air when the water in the high-pressure water apparatus 68 flows from the high-pressure water apparatus 68 to the low-pressure water apparatus 66.

The potential energy of the high-pressure water apparatus 68 is used to compress air from atmosphere into the compressed air storage unit 62. As such, water moves up and down between the low-pressure water apparatus 66 and the high-pressure water apparatus 68. The excess electric power is converted into pressure potential energy in the compressed air storage unit 62 through the gas-water energy exchange unit 64.

In comparison to reservoirs of a conventional pumped hydroelectric energy storage system, the high-pressure water apparatus 68 and the low-pressure water apparatus 66 in the energy storage system 100 form a buffer stage rather than an energy storage unit. The amount of energy stored in the energy storage system 100 is proportional to the mass of the compressed air rather than the capacity of the water apparatuses.

During peak hours of the power utility grid 72, the compressed air of the compressed air storage unit 62 is released through the gas-water energy exchange unit 64. The expanded air pumps the water of the low-pressure water apparatus 66 into the high-pressure water apparatus 68. At the same time, the water of the high-pressure water apparatus 68 is released and flows down to the low-pressure water apparatus 66 through a water turbine. The water turbine may be coupled to a power generator, which converts the potential energy of the high-pressure water apparatus 68 into electric power and feeds the electric power into the power utility grid 72 to satisfy the power demand of the peak hours.

Similar to the operation of the off-peak hours, the high-pressure water apparatus 68 and the low-pressure water apparatus 66 may function as a buffer stage between the compressed air storage unit 62 and the power utility grid 72. Such a buffer stage does not require a large volume of water because the water in the energy storage system 100 moves up and down between the high-pressure water apparatus 68 and the low-pressure water apparatus 66. The amount of water remains substantially constant within a long period of time if water losses such as evaporation, leaks and the like are ignored.

The gas-water energy exchange unit 64 may comprise a plurality of valves, pistons, cylinders, other hydraulic transmission devices, any combinations thereof and/or the like. The detailed structure of the gas-water energy exchange unit 64 will be described below with respect to FIGS. 12-15.

In sum, the amount of the energy stored in the energy storage system 100 is proportional to the mass of compressed air in the compressed air storage unit 62. In other words, the capacity of the high-pressure water apparatus 68 and the low-pressure water apparatus 66 is not directly related to the energy stored in the energy storage system 100. The high-pressure water apparatus 68 and the low-pressure water apparatus 66 may form a buffer stage between the compressed air storage unit 62 and the power utility grid 72. Such a buffer stage helps to smoothly convert energy between the compressed air storage unit 62 and the power utility grid 72.

In comparison to a conventional pumped storage hydroelectric system, the energy storage system 100 does not require high capacity reservoirs. As a result, one advantageous feature of the energy storage system 100 is that the storage technique shown in FIG. 1 is suitable for arid zones or desert regions with scarce water resources but rich of renewable energy resources.

Figure 2:
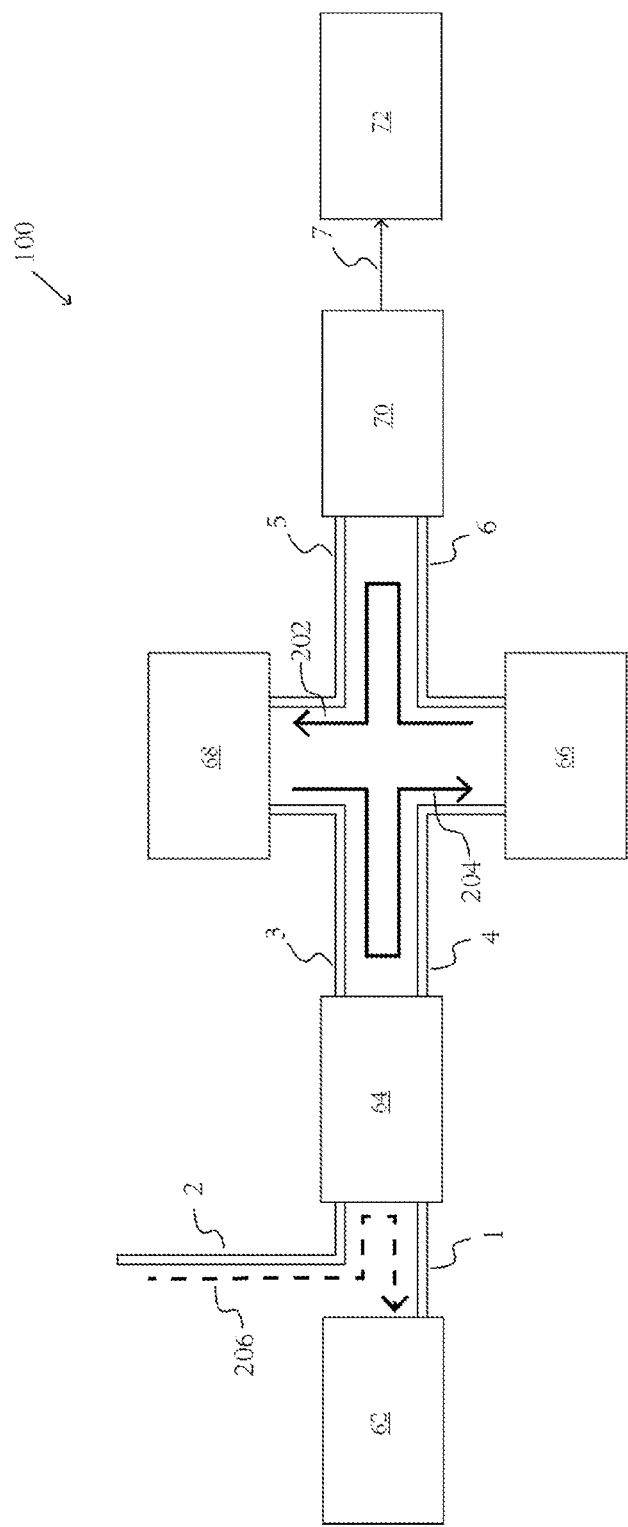
FIG. 2 illustrates a block diagram of the energy storage system shown in FIG. 1 operating in an energy storage phase in accordance with various embodiments of the present disclosure.

FIG. 2 illustrates a block diagram of the energy storage system shown in FIG. 1 operating in an energy storage phase in accordance with various embodiments of the present disclosure. During off-peak hours of the power utility grid 72, extra electric power may be used to drive a pump transferring water from the low-pressure water apparatus 66 to the high-pressure water apparatus 68 as indicated by an arrow 202. Once the water is pumped into the high-pressure water apparatus 66, the water of the high-pressure water apparatus 66 flows back to the low-pressure water apparatus 66 through the gas-water energy exchange unit 64 as indicated by an arrow 204.

The potential energy of the high-pressure water apparatus 68 is used to compress air with an atmospheric pressure into the compressed air storage unit 62 as indicated by a dashed arrow 206. As such, water is circulating between the high-pressure water apparatus 68 and the low-pressure water apparatus 66. At the same time, extra electric power of the power utility grid 72 is converted into pressure potential energy, which is stored in the compressed air storage unit 62.

In sum, in the energy storage phase, excess electric power energy is converted into water potential energy through the pumped hydroelectric power generation unit 70, and then the water potential energy is converted into pressure potential energy through the gas-water energy exchange unit 64. The energy storage capacity is proportional to the capacity of the compressed air storage unit 62.

Figure 3:
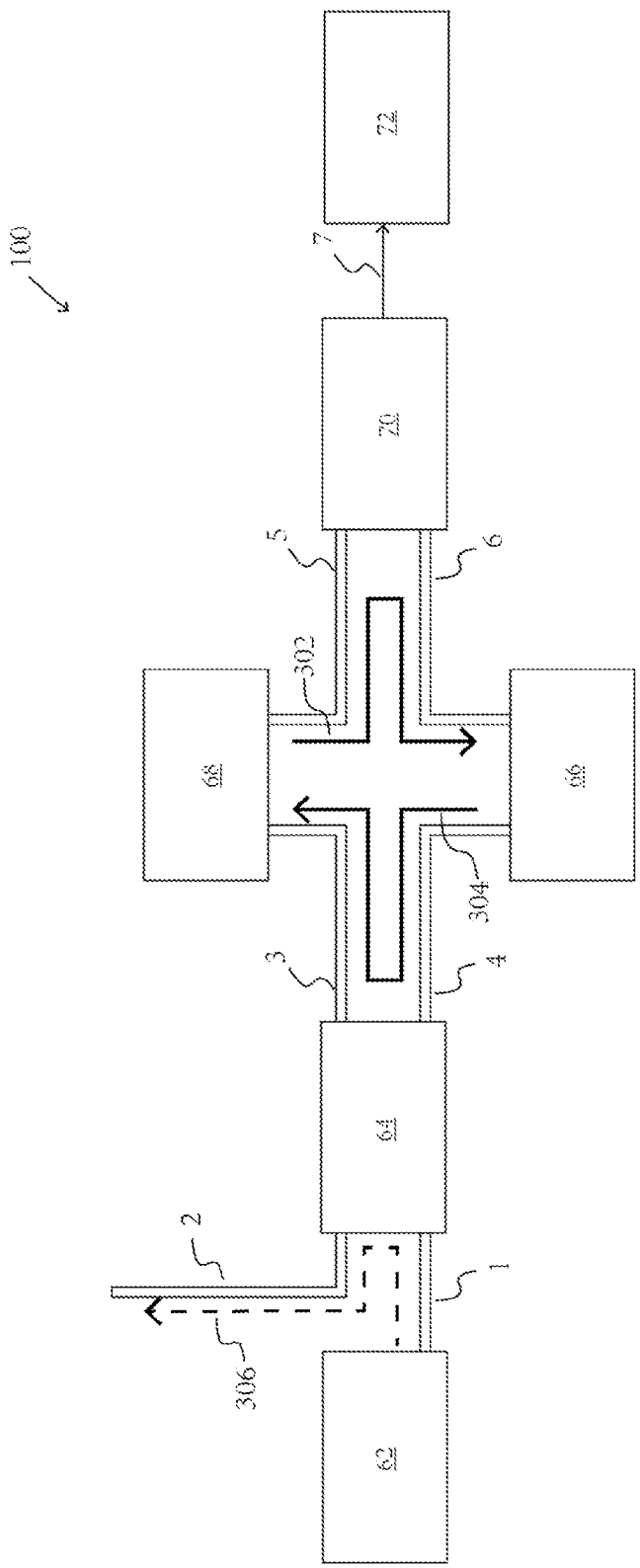
FIG. 3 illustrates a block diagram of the energy storage system shown in FIG. 1 operating in an energy release phase in accordance with various embodiments of the present disclosure.

FIG. 3 illustrates a block diagram of the energy storage system shown in FIG. 1 operating in an energy release phase in accordance with various embodiments of the present disclosure. During peak hours of the power utility grid 72, as indicated by a dashed arrow 306, the stored energy of the compressed air storage unit 62 may be released through the expansion of the compressed air. In particular, through the gas-water energy exchange unit 64, the expanded air transfers water from the low-pressure water apparatus 66 to the high-pressure water apparatus 68 as indicated by an arrow 304.

Once the water is transferred into the high-pressure water apparatus 68, the water of the high-pressure water apparatus 66 flows back to the low-pressure water apparatus 66 through a water turbine as indicated by an arrow 302. The water turbine is coupled to a power generator. The rotary motion of the water turbine converts the potential energy of the high-pressure water apparatus 66 into electric power, which is sent back to the power utility grid 72. Similar to the water circulation shown in FIG. 2, water is circulating between the high-pressure water apparatus 68 and the low-pressure water apparatus 66 when the energy storage system 100 operates in an energy release phase.

Figure 4:
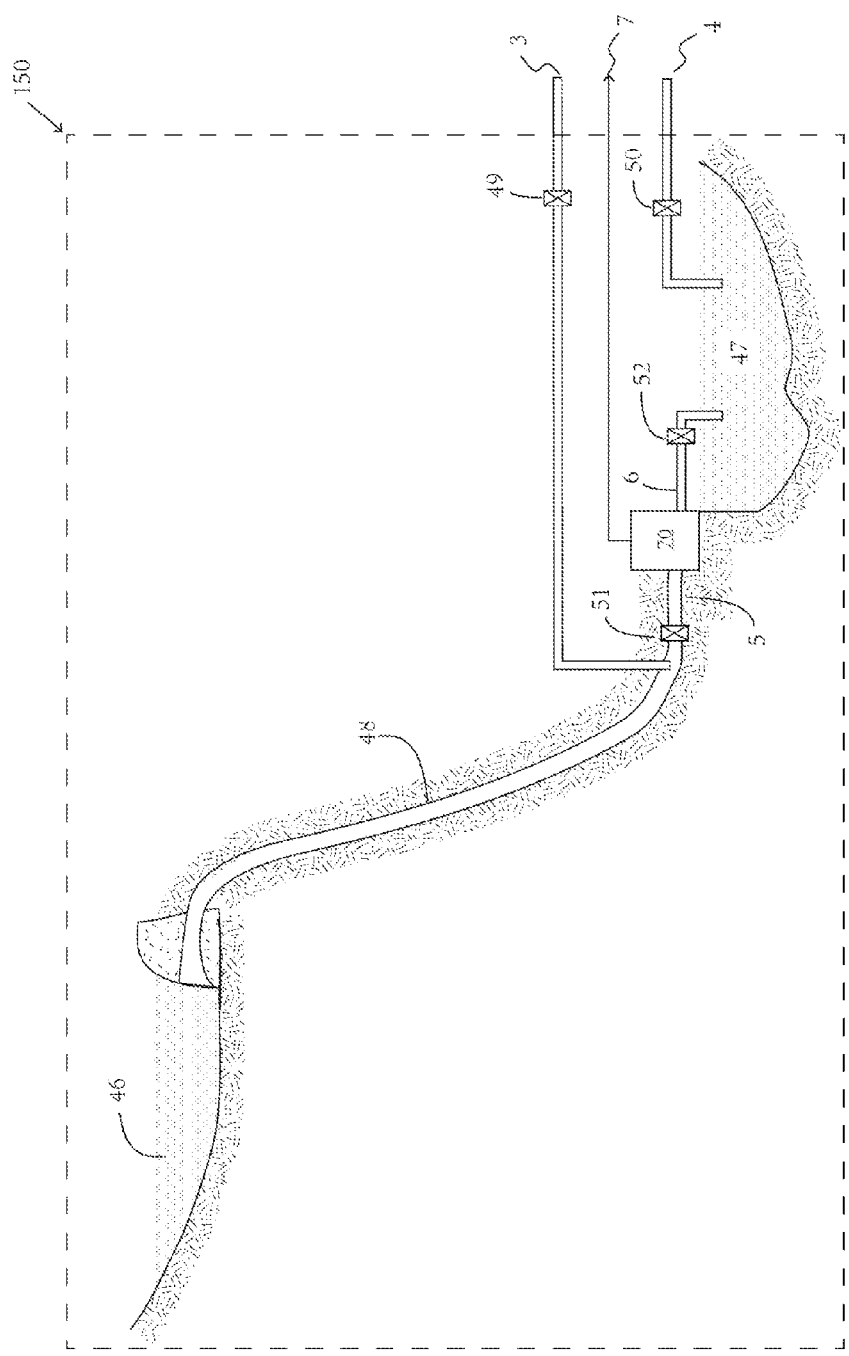
FIG. 4 illustrates a cross sectional view of an exemplary implementation of the high-pressure water apparatus and the low-pressure water apparatus shown in FIG. 1 in accordance with various embodiments of the present disclosure.

FIG. 4 illustrates a cross sectional view of an exemplary implementation of the high-pressure water apparatus and the low-pressure water apparatus shown in FIG. 1 in accordance with various embodiments of the present disclosure. The high-pressure water apparatus 68 shown in FIG. 1 may be implemented as an upstream reservoir 46. The low-pressure water apparatus 66 shown in FIG. 1 may be implemented as a downstream reservoir 47.

The upstream reservoir 46 is an elevated reservoir in comparison with the downstream reservoir 47. There may be a high-pressure water pipe 48 coupled between the upstream reservoir 46 and the downstream reservoir 47. A person skilled in the art will recognize that this implementation is similar to the reservoir implementation in a conventional pumped storage hydroelectric system.

In some embodiments, the elevation difference between the upstream reservoir 46 and the downstream reservoir 47 is about 300 m. Such an elevation difference helps to generate a stable pressure difference at the high-pressure water pipes (e.g., the second high-pressure water pipe 5) and the low-pressure water pipes (e.g., the second low-pressure water pipe 6). One advantageous feature of having a stable pressure difference is that during a power generation phase the turbine and the power generator coupled to the turbine may operate at high efficiency because the turbine is designed such that it operates efficiently at a stable water pressure head. In some embodiments, the efficiency of the turbine and the power generator may be in a range from about 94% to about 97%.

As shown in FIG. 4, there is a first high-pressure water pipe 3 coupled to the upstream reservoir 46 through the high-pressure water pipe 48. Likewise, a first low-pressure water pipe 4 is coupled to the downstream reservoir 47. In addition, both the first high-pressure water pipe 3 and the first low-pressure water pipe 4 are coupled to the gas-water energy exchange unit 64 (not shown but illustrated in FIG. 1), which is further coupled to the compressed air storage unit 62.

FIG. 4 further illustrates the pumped hydroelectric power generation unit 70 is coupled to the upstream reservoir 46 and the downstream reservoir 47 through the second high-pressure water pipe 5 and the second low-pressure water pipe 6 respectively. There may be a plurality of valves such as 49, 50, 51 and 52, which are employed to control the water flow in each water pipe. The functions of valves in a hydroelectric power system are well known, and hence are not discussed in further detail herein.

As described above with respect to FIG. 1, the capacity of the energy storage system 100 is determined by the compressed air storage unit 62 (not shown but illustrated in FIG. 1). In other words, the capacity is not related to the capacity of the buffer stage 150 formed by the upstream reservoir 46 or the downstream reservoir 47. Therefore, the energy storage mechanism shown in FIG. 4 has a lower storage capacity requirement on both the upstream reservoir 46 and the downstream reservoir 47.

During an energy storage phase, a pump (not shown) of the pumped hydroelectric power generation unit 70 transfers water from the downstream reservoir 47 to the upstream reservoir 46 through the second high-pressure water pipe 5 and the high-pressure water pipe 48 coupled to the upstream reservoir 46. Furthermore, the water in the first high-pressure water pipe 3 is used to compress air through a path formed by the first high-pressure water pipe 3, the gas-water energy exchange unit 64 (not shown) and the first low-pressure water pipe 4. Once the water leaves the gas-water energy exchange unit 64, it flows into the downstream reservoir 47 through the first low-pressure water pipe 4. As such, water is circulating between the upstream reservoir 46 and the downstream reservoir 47.

During an energy release phase, through the gas-water energy exchange unit 64, the expanded air transfers water from the downstream reservoir 47 to the upstream reservoir 46 through a path formed by the first low-pressure water pipe 4, the gas-water energy exchange unit 64 and the first high-pressure water pipe 3. Once the water is transferred into the upstream reservoir 46, the water of the upstream reservoir 46 flows back to the downstream reservoir 47 through a water turbine (not shown) of the pumped hydroelectric power generation unit 70 and the second low-pressure water pipe 6. The water turbine is coupled to a power generator. The rotary motion of the water turbine converts the potential energy of the upstream reservoir 46 into electric power, which is sent back to the power utility grid 72.

Figure 5:
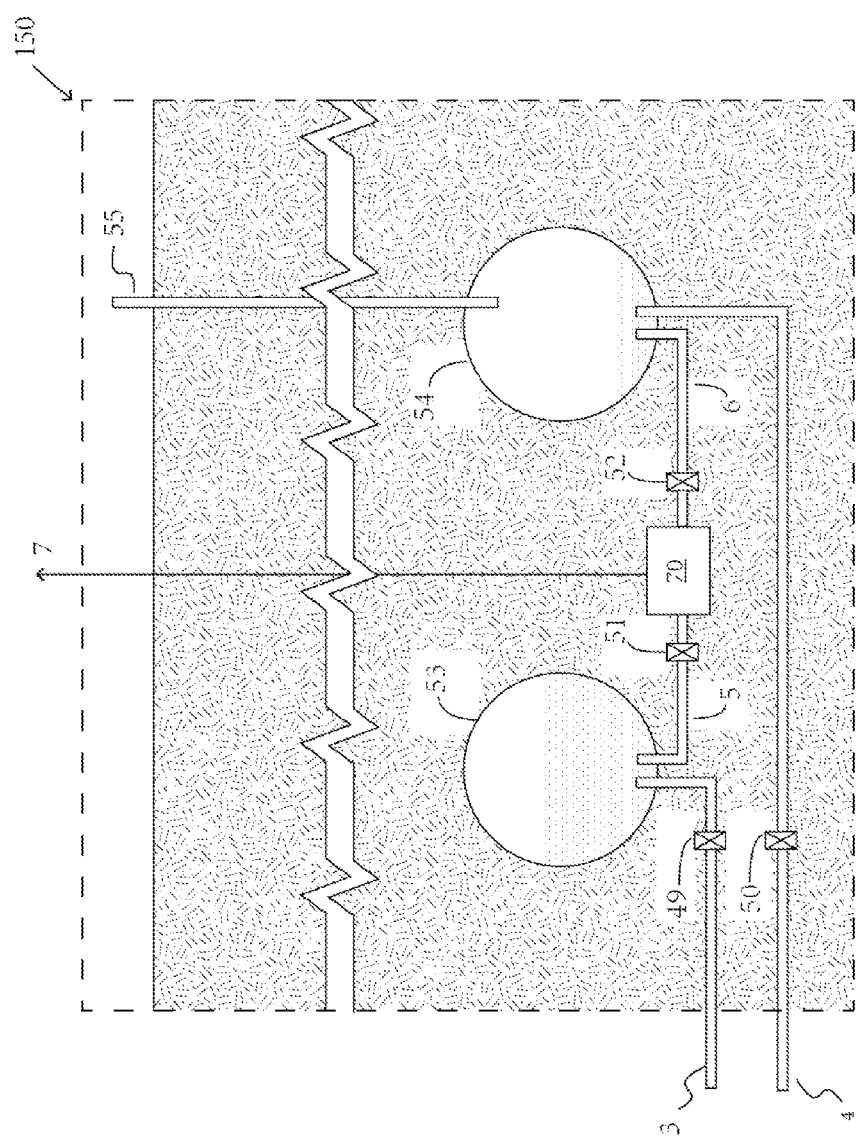
FIG. 5 illustrates a cross sectional view of another exemplary implementation of the high-pressure water apparatus and the low-pressure water apparatus shown in FIG. 1 in accordance with various embodiments of the present disclosure.

FIG. 5 illustrates a cross sectional view of another exemplary implementation of the high-pressure water apparatus and the low-pressure water apparatus shown in FIG. 1 in accordance with various embodiments of the present disclosure. In some embodiments, the upstream reservoir 46 and the downstream reservoir 47 shown in FIG. 4 may be implemented as a first mixed gas-water container 53 and a second mixed gas-water container 54. The first mixed gas-water container and the second mixed gas-water container may be placed on the surface, underground, any combinations thereof and/or the like.

FIG. 5 illustrates an embodiment having both the first mixed gas-water container 53 and the second mixed gas-water container 54 placed underground. The first mixed gas-water container 53 is of a higher pressure level and functions as the high-pressure water apparatus. On the other hand, the second mixed gas-water container 54 is of a lower pressure level and functions as the low-pressure water apparatus.

In accordance with some embodiments, the first mixed gas-water container 53 can be implemented as an underground storage structure formed by steel frames and concrete. Alternatively, the first mixed gas-water container 53 may be a high-pressure metal spherical tank. Furthermore, the first mixed gas-water container 53 can be implemented as a gas pipeline. The second mixed gas-water container 54 may be implemented as a reservoir, a pool and/or the like.

In order to achieve a high-pressure level, compressed air may be injected into the high-pressure mixed gas-water container 53 to form a preset pressure level. After water has been injected into the water container 53, the compressed air and water may generate a high-pressure level. In some embodiments, the internal pressure of the high-pressure mixed gas-water container 53 is approximately equal to 3 megapascals. In order to maintain such a high-pressure level, the high-pressure mixed gas-water container 53 may be sealed. It should be noted that such a pressure level (e.g., 3 megapascals) is equivalent to the pressure generated by an upstream reservoir having an elevation level of 300 m.

The low-pressure mixed gas-water container 54 may be coupled to the atmosphere through a pipe 55. During an energy release phase, the pipe 55 may function as an exhaust pipe through which expanded air may be vented back to the atmosphere. The internal pressure level of the low-pressure mixed gas-water container 54 is approximately equal to 0.1 megapascals. The configuration of the water pipes is similar to that shown in FIG. 4, and hence is not discussed again to avoid repetition.

In sum, the low-pressure mixed gas-water container 54 and the high-pressure mixed gas-water container 53 shown in FIG. 5 provide an alternative solution for achieving the pressure difference generated by the downstream reservoir 47 and the upstream reservoir 46 shown in FIG. 4.

During an energy release phase, through the high-pressure water pipe 5, the high-pressure water in underground high-pressure mixed gas-water container 53 will drive hydroelectric generating apparatus such as a water turbine in pumped storage power generation unit 70, and then through a second low-pressure water pipe 6 flows into the underground low-pressure mixed gas-water container 54. At the same time, the water of the underground low-pressure mixed gas-water container 54 is extracted through the first low-pressure water pipe 4 and injected into the high-pressure mixed gas-water container 53 by the expanded air through the gas-water exchange unit 64. As such, the total amount of water remains substantially steady during the energy release phase.

During an energy storage phase, water in the low-pressure mixed gas-water container 54 is pumped into high-pressure mixed gas-water container 53 by a pump in the hydroelectric power generation unit 70. As such, the energy is converted to potential energy of the water stored in the high-pressure mixed gas-water container 53. At the same time, the high-pressure water in the high-pressure mixed gas-water container 53 compresses the gas through the gas-water energy exchange unit 64 (not shown but illustrated in FIG. 1) and flows into the low-pressure mixed gas-water container 54 through the first low-pressure water pipe 4.

It should be noted that the water flowing from water container 53 to water container 54 may substantially be the same as the water flowing from water container 54 to water container 53. As a result, the total amount of water in the high and low-pressure containers will remain unchanged. Moreover, the pressure of each water container remains unchanged. In other words, the compression pressure of the high-pressure mixed gas-water container 53 may be kept constant. Such a constant pressure level in the high-pressure mixed gas-water container 53 is equivalent to the pressure generated by the potential energy of the upstream reservoir 46 shown in FIG. 4.

Figure 6:
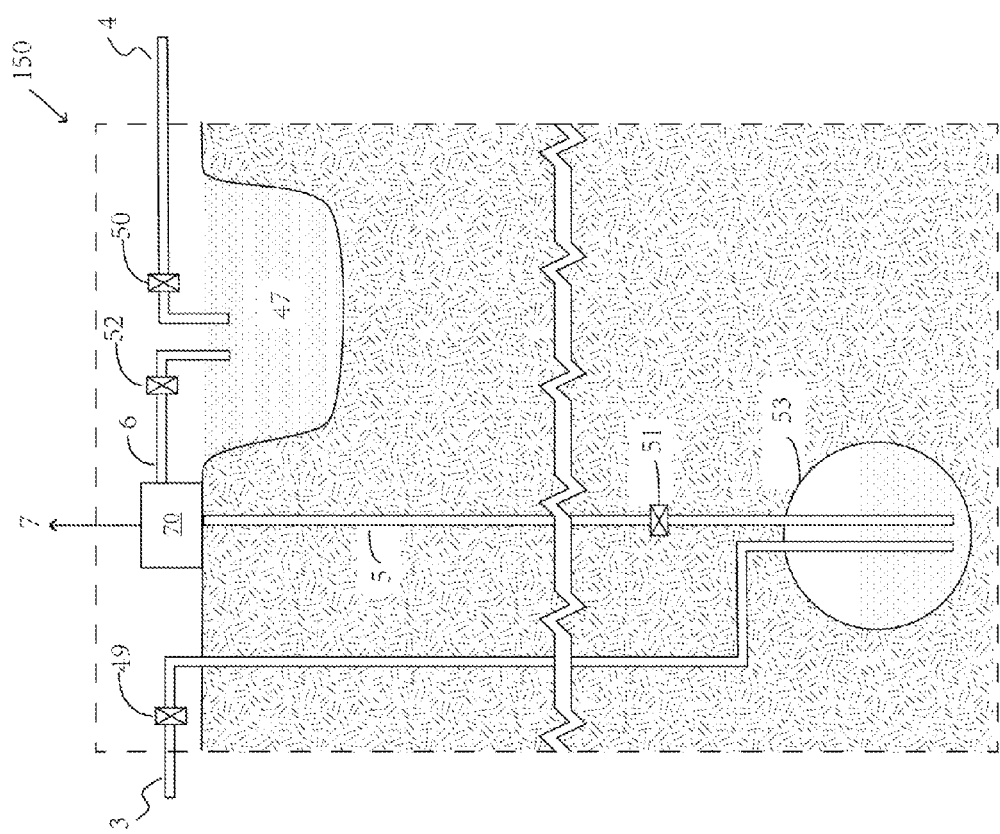
FIG. 6 illustrates a cross sectional view of yet another exemplary implementation of the high-pressure water apparatus and the low-pressure water apparatus shown in FIG. 1 in accordance with various embodiments of the present disclosure.

FIG. 6 illustrates a cross sectional view of yet another exemplary implementation of the high-pressure water apparatus and the low-pressure water apparatus shown in FIG. 1 in accordance with various embodiments of the present disclosure. The configuration of the high-pressure water apparatus and low-pressure water apparatus is similar to that shown in FIG. 5 except that the low-pressure water apparatus is implemented as a downstream reservoir 47 on the land's surface. The operation principles during the energy storage phase and energy release phase are similar to those described above with respect to FIG. 5, and hence are not discussed in further detail to avoid repetition.

Figure 7:
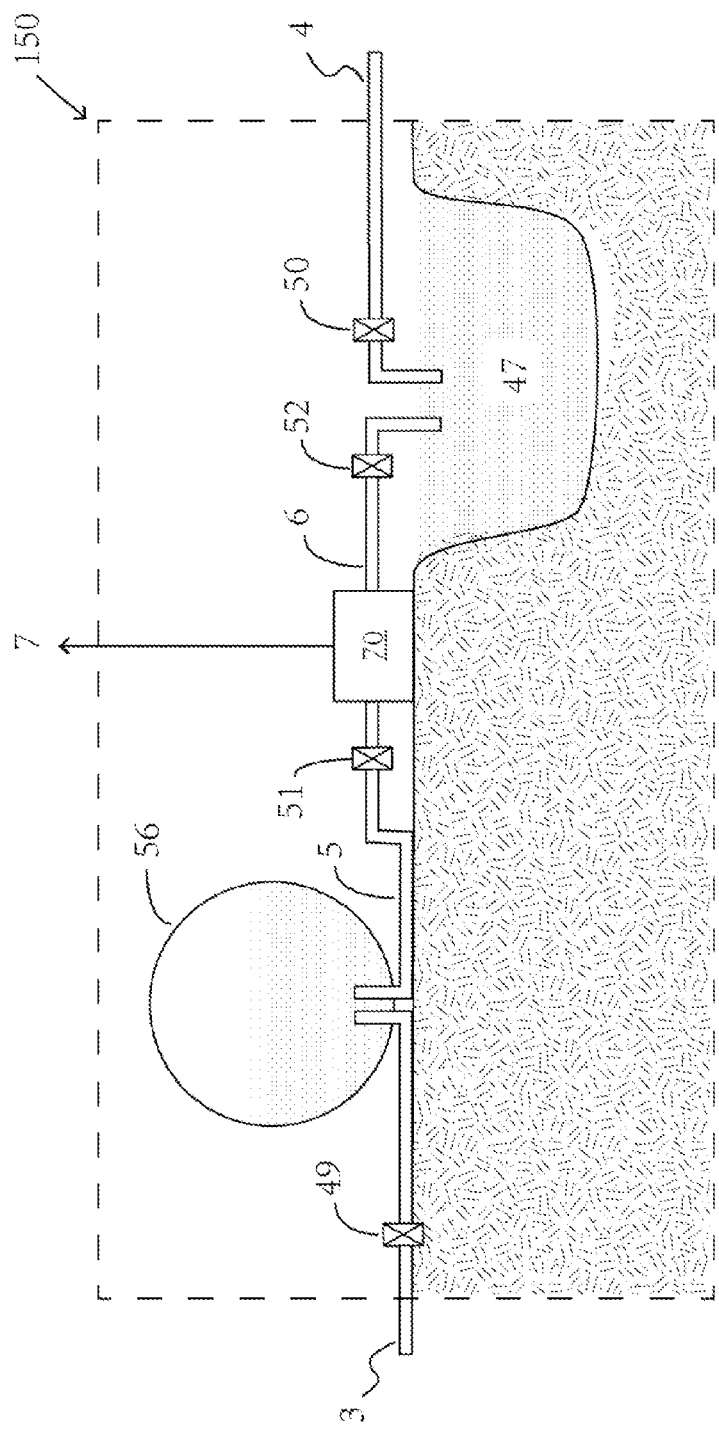
FIG. 7 illustrates a cross sectional view of yet another exemplary implementation of the high-pressure water apparatus and the low-pressure water apparatus shown in FIG. 1 in accordance with various embodiments of the present disclosure.

FIG. 7 illustrates a cross sectional view of yet another exemplary implementation of the high-pressure water apparatus and the low-pressure water apparatus shown in FIG. 1 in accordance with various embodiments of the present disclosure. The configuration of the high-pressure water apparatus and low-pressure water apparatus is similar to that shown in FIG. 6 except that the high-pressure water apparatus is a high-pressure water tank 56 placed on the land's surface. The operation principles during the energy storage phase and energy release phase are similar to those described above with respect to FIG. 5, and hence are not discussed in further detail to avoid repetition.

One advantageous feature of having the high-pressure water tank 56 placed on the land's surface is that the maintenance and repair costs of the buffer stage 150 shown in FIG. 7 is relatively low compared to a buffer stage 150 having a tank placed underneath the land's surface.

Figure 8:
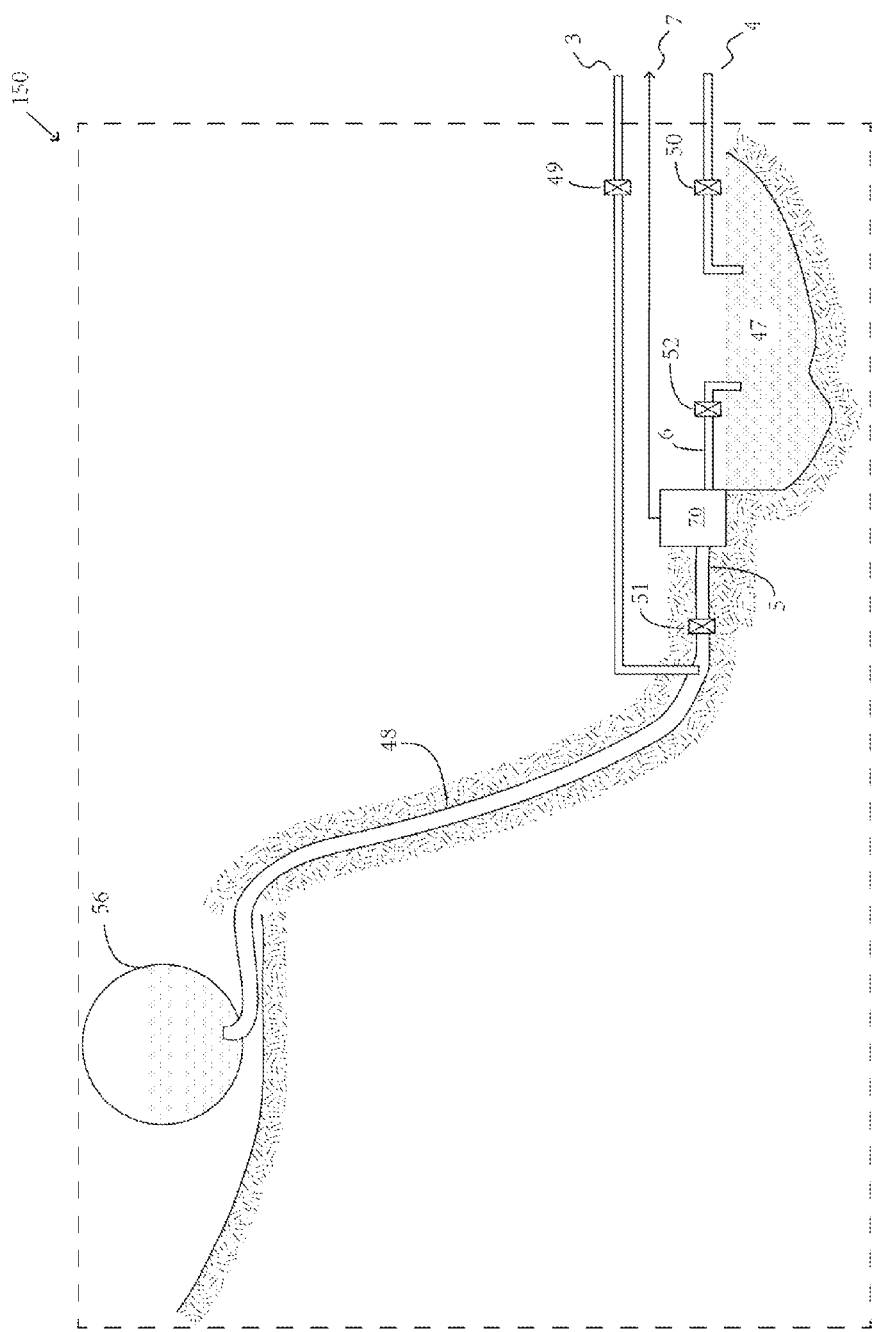
FIG. 8 illustrates a cross sectional view of yet another exemplary implementation of the high-pressure water apparatus and the low-pressure water apparatus shown in FIG. 1 in accordance with various embodiments of the present disclosure.

FIG. 8 illustrates a cross sectional view of yet another exemplary implementation of the high-pressure water apparatus and the low-pressure water apparatus shown in FIG. 1 in accordance with various embodiments of the present disclosure. The configuration of the high-pressure water apparatus and low-pressure water apparatus is similar to that shown in FIG. 7 except that the high-pressure water tank 56 is placed on an elevated surface. In other words, the configuration shown in FIG. 8 is a combination between the configuration shown in FIG. 4 and the configuration shown in FIG. 7. The operation principles during the energy storage phase and the energy release phase are similar to those described above with respect to FIG. 5, and hence are not discussed in further detail to avoid repetition.

One advantageous feature of having the high-pressure water tank 56 placed on an elevated surface is that the elevation difference between the high-pressure water tank 56 and the downstream reservoir 47 may help to reduce the manufacture complexity of the high pressure water tank 56. Because the elevation difference contributes to the pressure at the lower end of the high-pressure water pipe 48, the pressure on the tank frame shown in FIG. 8 is not as high as that shown in FIG. 7. The scheme shown in FIG. 8 is suitable for a natural environment with a limited elevation difference.

Figure 9:
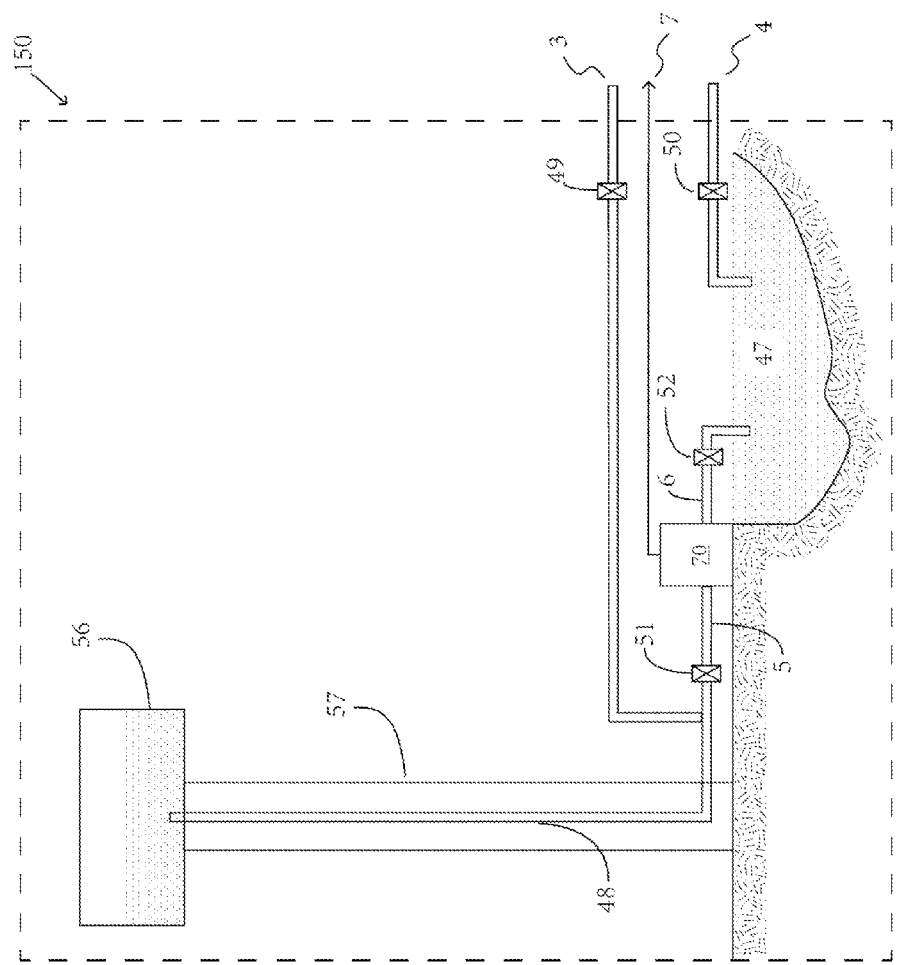
FIG. 9 illustrates a cross sectional view of yet another exemplary implementation of the high-pressure water apparatus and the low-pressure water apparatus shown in FIG. 1 in accordance with various embodiments of the present disclosure.

FIG. 9 illustrates a cross sectional view of yet another exemplary implementation of the high-pressure water apparatus and the low-pressure water apparatus shown in FIG. 1 in accordance with various embodiments of the present disclosure. The configuration of the high-pressure water apparatus and low-pressure water apparatus is similar to that shown in FIG. 8 except that the elevated surface shown in FIG. 8 is replaced by a water tower 57. The first high-pressure water pipe 3 and the second high-pressure water pipe 5 are coupled to the high-pressure water tank 56 through a high-pressure water pipe 48 as shown in FIG. 9. The operation principle of a high water tower is well known in the art, and hence is not discussed in detail herein.

Figure 10:
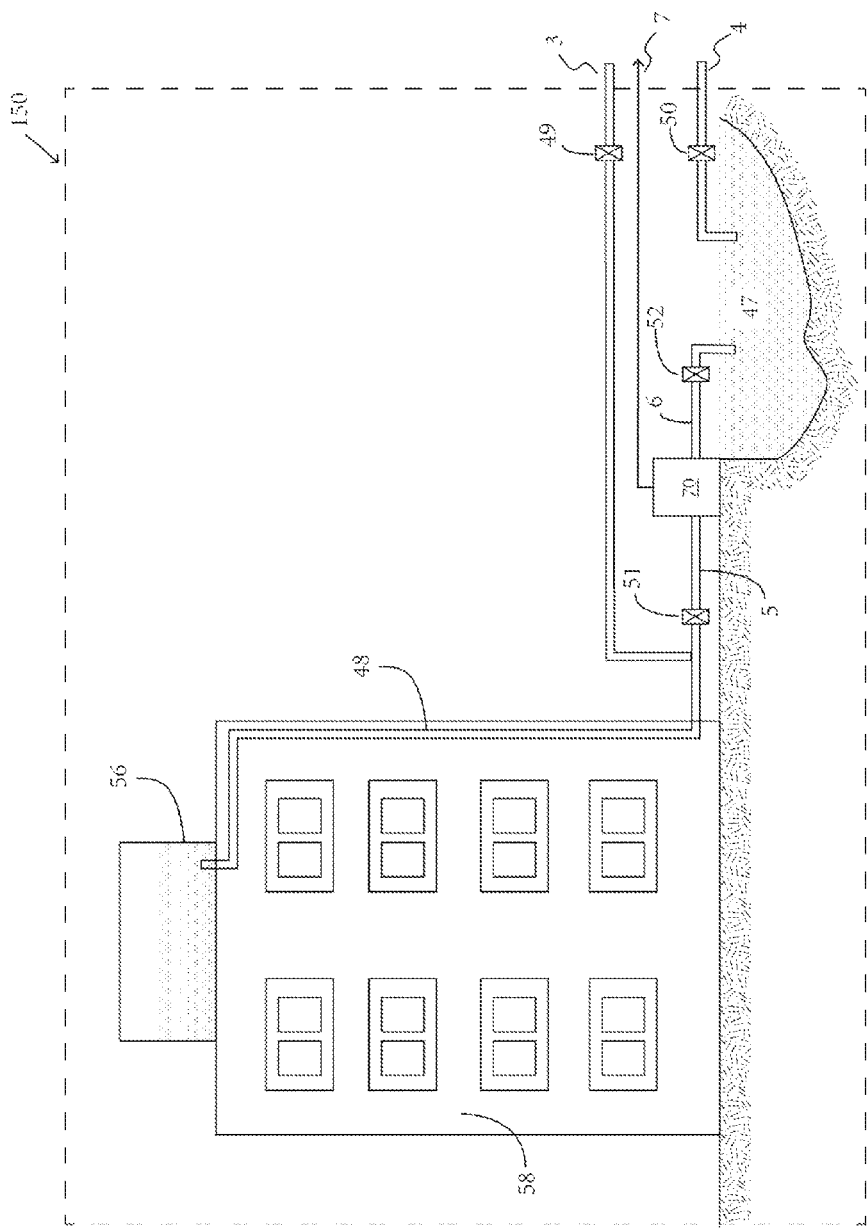
FIG. 10 illustrates a cross sectional view of yet another exemplary implementation of the high-pressure water apparatus and the low-pressure water apparatus shown in FIG. 1 in accordance with various embodiments of the present disclosure.

FIG. 10 illustrates a cross sectional view of yet another exemplary implementation of the high-pressure water apparatus and the low-pressure water apparatus shown in FIG. 1 in accordance with various embodiments of the present disclosure. The configuration of the high-pressure water apparatus and low-pressure water apparatus is similar to that shown in FIG. 8 except that the elevated surface is replaced by a building 58. The first high-pressure water pipe 3 and the second high-pressure water pipe 5 are coupled to the high-pressure water tank 56 through a high-pressure water pipe 48 as shown in FIG. 10. The operation principle of a tank on top of a building is well known in the art, and hence is not discussed in detail herein to avoid unnecessary repetition.

Figure 11:
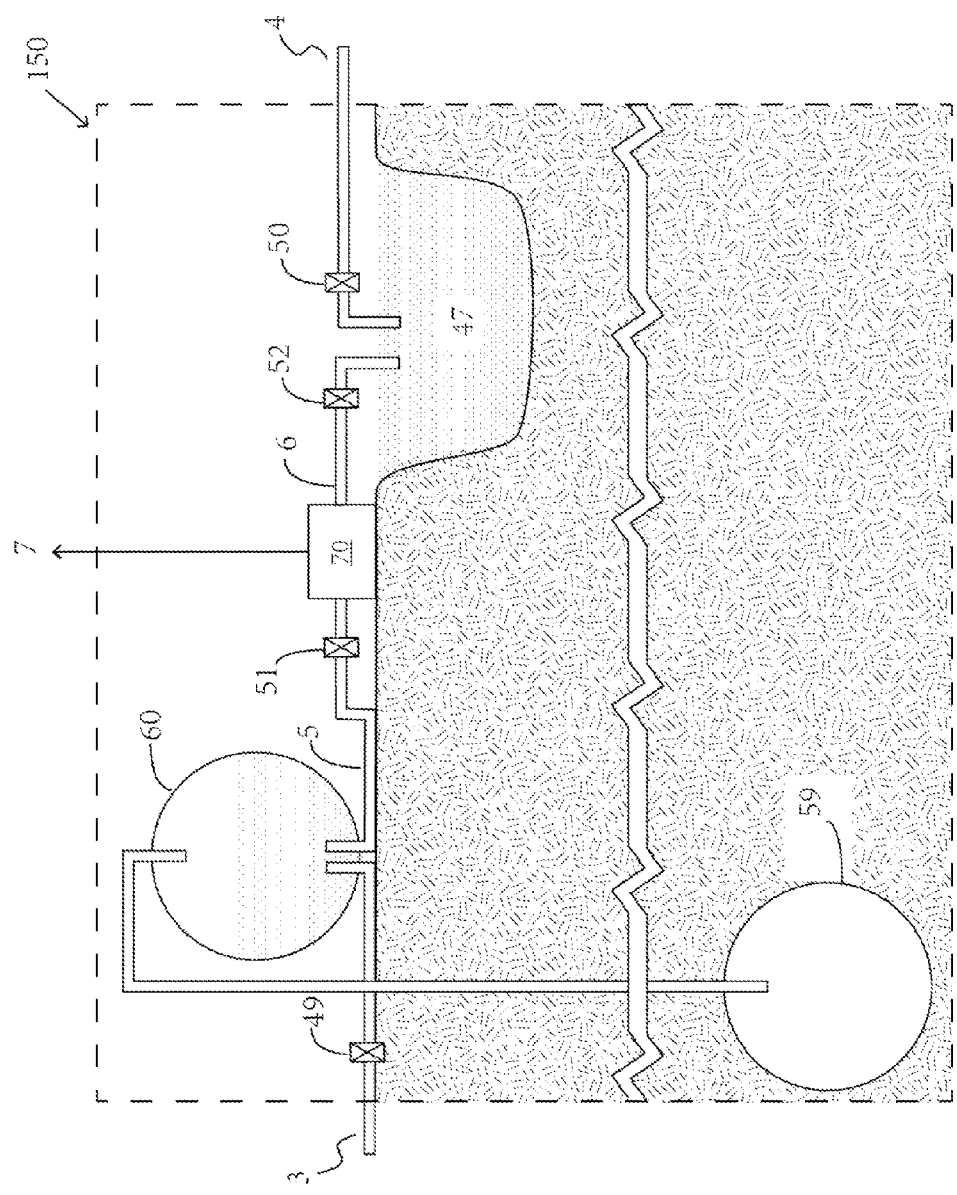
FIG. 11 illustrates a cross sectional view of yet another exemplary implementation of the high-pressure water apparatus and the low-pressure water apparatus shown in FIG. 1 in accordance with various embodiments of the present disclosure.

FIG. 11 illustrates a cross sectional view of yet another exemplary implementation of the high-pressure water apparatus and the low-pressure water apparatus shown in FIG. 1 in accordance with various embodiments of the present disclosure. The configuration of the high-pressure water apparatus and low-pressure water apparatus is similar to that shown in FIG. 7 except that an auxiliary high-pressure water tank 59 is employed to increase the flexibility of the energy storage system. As shown in FIG. 11, the auxiliary high-pressure water tank 59 is placed underground and coupled to the high-pressure water tank 60 through a pipe. The operation principle of a high-pressure tank placed underneath the land surface is discussed in detail with respect to FIG. 5, and hence is not discussed again.

It should be noted while FIG. 11 illustrates the auxiliary high-pressure water tank 59 is located underneath the high-pressure water tank 60, a person skilled in art will recognize that this is merely an example. There may be many alternatives, modifications and variations. For example, the auxiliary high-pressure water tank 59 may be placed underneath the downstream reservoir 47 and a horizontal pipe (not shown) is employed to connect the auxiliary high-pressure water tank 59.

Figure 12:
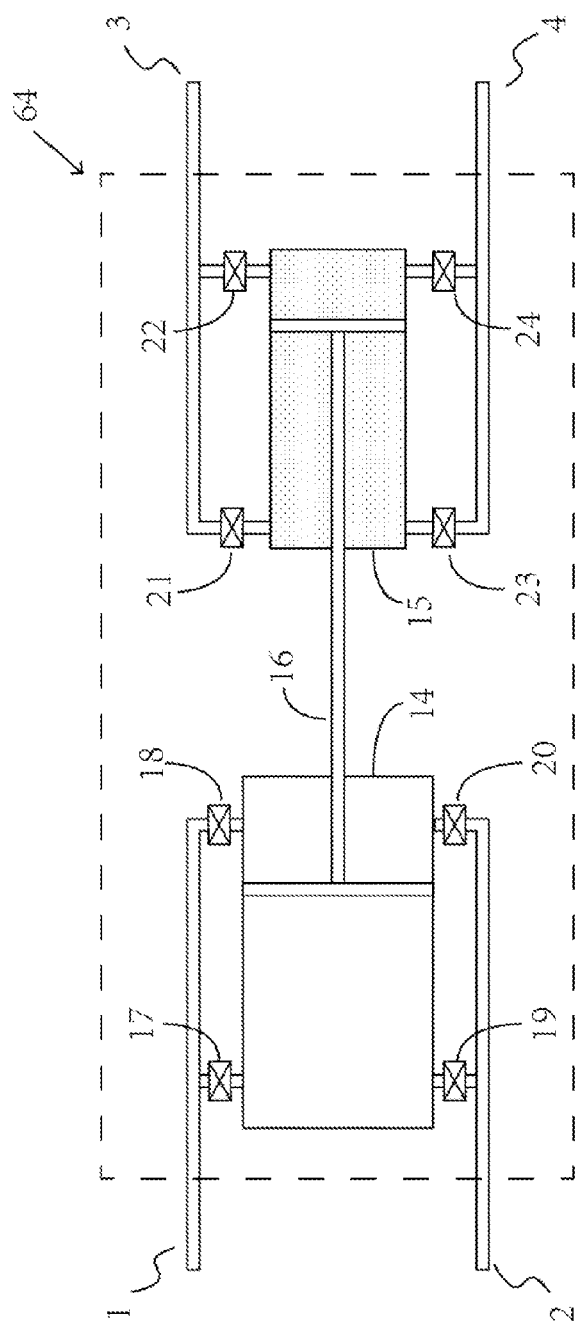
FIG. 12 illustrates a cross sectional view of an exemplary implementation of the gas and water energy exchange unit shown in FIG. 1 in accordance with various embodiments of the present disclosure.

FIG. 12 illustrates a cross sectional view of an exemplary implementation of the gas and water energy exchange unit shown in FIG. 1 in accordance with various embodiments of the present disclosure. The gas and water energy exchange unit 64 may include a plurality of cylinders and a plurality of pistons.

As shown in FIG. 12, the high-pressure gas pipe 1 is connected between the gas-water energy exchange unit 64 and the compressed air storage unit 62 (not shown but illustrated in FIG. 1). The low-pressure gas pipe 2 maintains a relatively low-pressure level. The low-pressure gas pipe 2 is connected to the ambient atmosphere in accordance with some embodiments. The first high-pressure water pipe 3 and the first low-pressure water pipe 4 are connected to the high-pressure water apparatus 68 and the low-pressure water apparatus 66 respectively.

As shown in FIG. 12, a first cylinder 14 may include a first compartment and a second compartment. More particularly, the first compartment and the second compartment are separated by a piston slidably disposed within the first cylinder 14. The second cylinder 15 may be of a same structure as the first cylinder 14 except that the second cylinder 15 is coupled to water pipes 3 and 4. As a result, the chamber of the second cylinder 15 is filled with water. FIG. 12 further illustrates that the piston in the first cylinder 14 and the piston in the second cylinder 15 are connected together through a piston rod 16.

In each cylinder, there may be four valves. The cylinder is divided into two adjustable portions by the piston. In the cylinder 14, two valves 17 and 19 may be located on a first side of the piston and another two valves 18 and 20 may be located on a second side of the piston. The two adjustable portions are connected to compressed air storage unit 62 and the ambient atmosphere through the valves 17, 18, 19 and 20.

In the cylinder 15, two valves 21 and 23 may be located on a first side of the piston and another two valves 22 and 24 may be located on a second side of the piston. The two adjustable portions are connected to the high-pressure water apparatus 68 and the low-pressure water apparatus 66 respectively. By the correct setting of the valve state, at any moment, one side of the piston within the cylinder 14 has a high-pressure gas, and the other side is connected to the low-pressure pipe 2. Likewise, one side of the piston within the cylinder 15 is high-pressure water and connected with the high-pressure water apparatus 68. The other side of the piston within the cylinder 15 is the low-pressure water and connected with the low-pressure water apparatus 66.

During an energy storage phase, the water pressure difference on both sides of the piston within the cylinder 15 drives the piston rod 16 to move. The motion of the piston rod 16 in the cylinder 14 compresses the air. When the pressure of the compressed air reaches a predetermined threshold, some valves such as 17 and 19 may be turned on so that the compressed air is pushed into the compressed air storage unit 62. As a result, the energy from the water pressure difference is converted into the potential energy of the compressed air in compressed air storage unit 62. It should be noted that the process described above requires an appropriate arrangement of the switching states of the valves in both cylinders.

Figure 13:
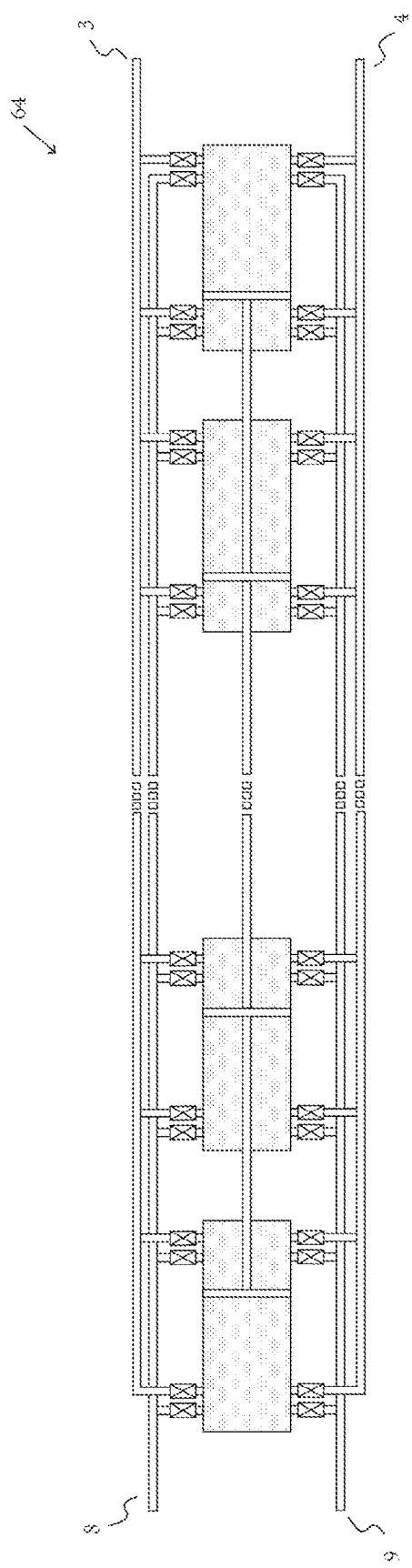
FIG. 13 illustrates a cross sectional view of another exemplary implementation of the gas and water energy exchange unit shown in FIG. 1 in accordance with various embodiments of the present disclosure.

FIG. 13 illustrates a cross sectional view of another exemplary implementation of the gas and water energy exchange unit shown in FIG. 1 in accordance with various embodiments of the present disclosure. The gas and water energy exchange unit 64 may comprise a plurality of cylinders connected in series. More particularly, as shown in FIG. 13, the first high-pressure water pipe 3 and the first low-pressure water pipe 4 are coupled to a first water pipe 8 and a second water pipe 9 through a plurality of cylinders connected in series.

Each cylinder may be substantially the same as the cylinder shown in FIG. 12. The cross sectional areas of the cylinders shown in FIG. 13 may be same or different depending on different applications and design needs. The operation of the cylinders in series can be coordinated by controlling the switching states of the valves of each cylinder. One skilled in the art will recognize that the series connected cylinders shown in FIG. 13 may be merely an example. There may be many alternatives, variations and modifications. For example, the cylinders in series shown in FIG. 13 may be divided into several groups depending on different applications.

Figure 14:
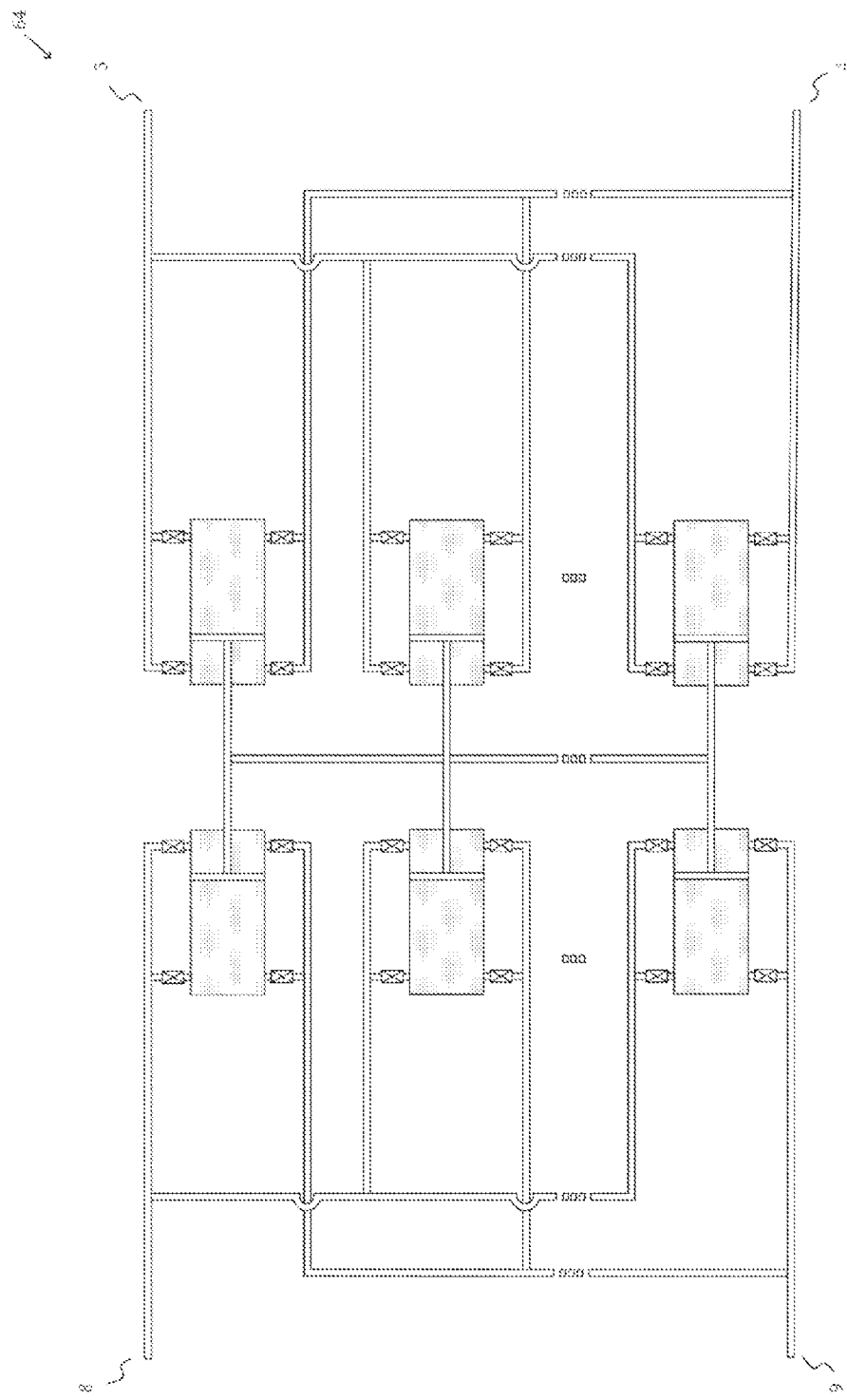
FIG. 14 illustrates a cross sectional view of yet another exemplary implementation of the gas and water energy exchange unit shown in FIG. 1 in accordance with various embodiments of the present disclosure.

FIG. 14 illustrates a cross sectional view of yet another exemplary implementation of the gas and water energy exchange unit shown in FIG. 1 in accordance with various embodiments of the present disclosure. The gas and water energy exchange unit 64 shown in FIG. 14 is similar to that shown in FIG. 13 except that a plurality of cylinders are connected in parallel. The operation principle of each single cylinder has been described above with reference to FIG. 12, and hence is not discussed again herein.

Figure 15:
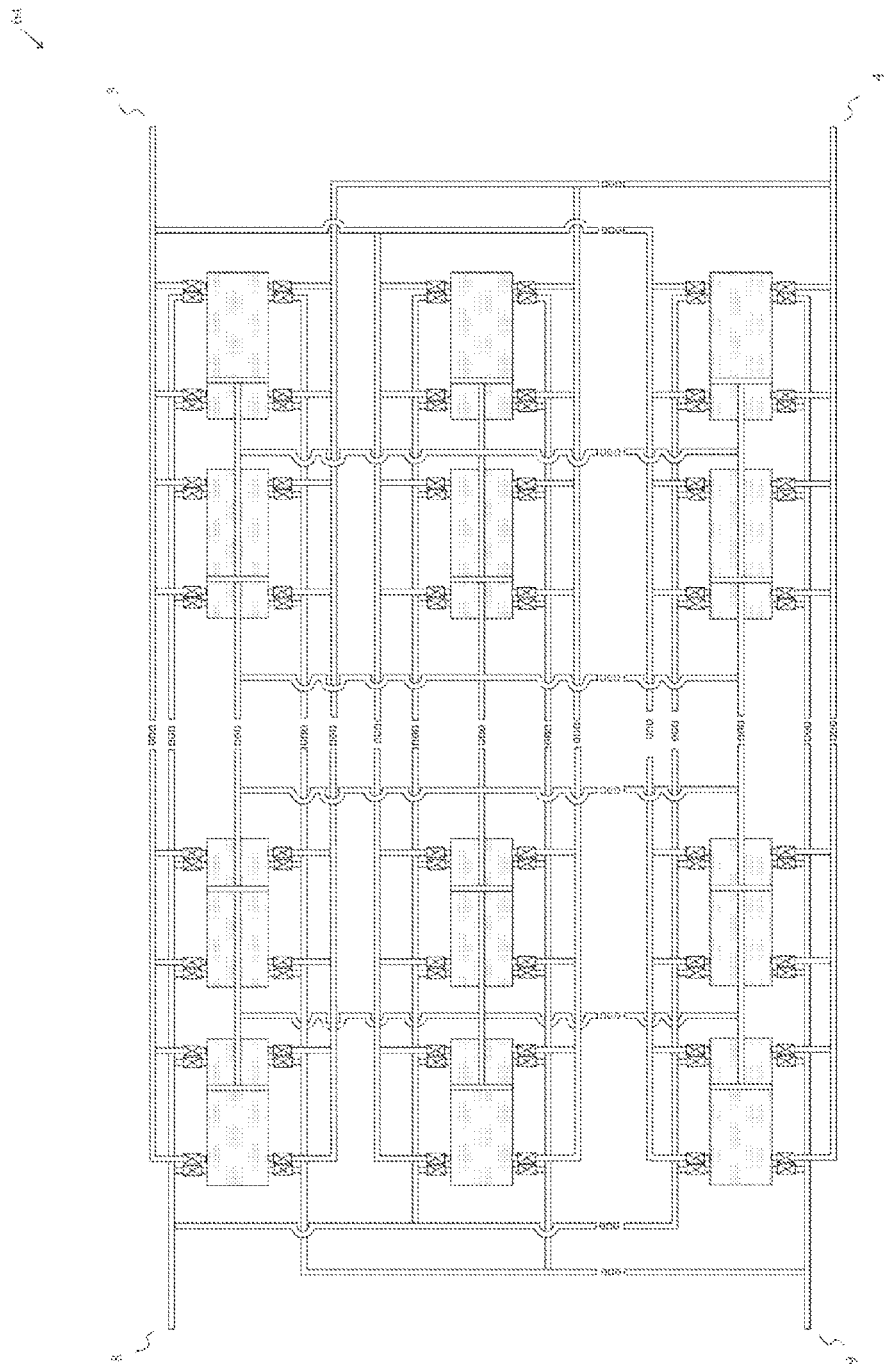
FIG. 15 illustrates a cross sectional view of yet another exemplary implementation of the gas and water energy exchange unit shown in FIG. 1 in accordance with various embodiments of the present disclosure.

FIG. 15 illustrates a cross sectional view of yet another exemplary implementation of the gas and water energy exchange unit shown in FIG. 1 in accordance with various embodiments of the present disclosure. The gas and water energy exchange unit shown in FIG. 15 is a combination of the series-connected cylinders shown in FIG. 13 and the parallel-connected cylinders shown in FIG. 14. The operation principle of having a plurality of cylinders connected in parallel and/or series is well known, and hence is not discussed again herein.

Figure 16:
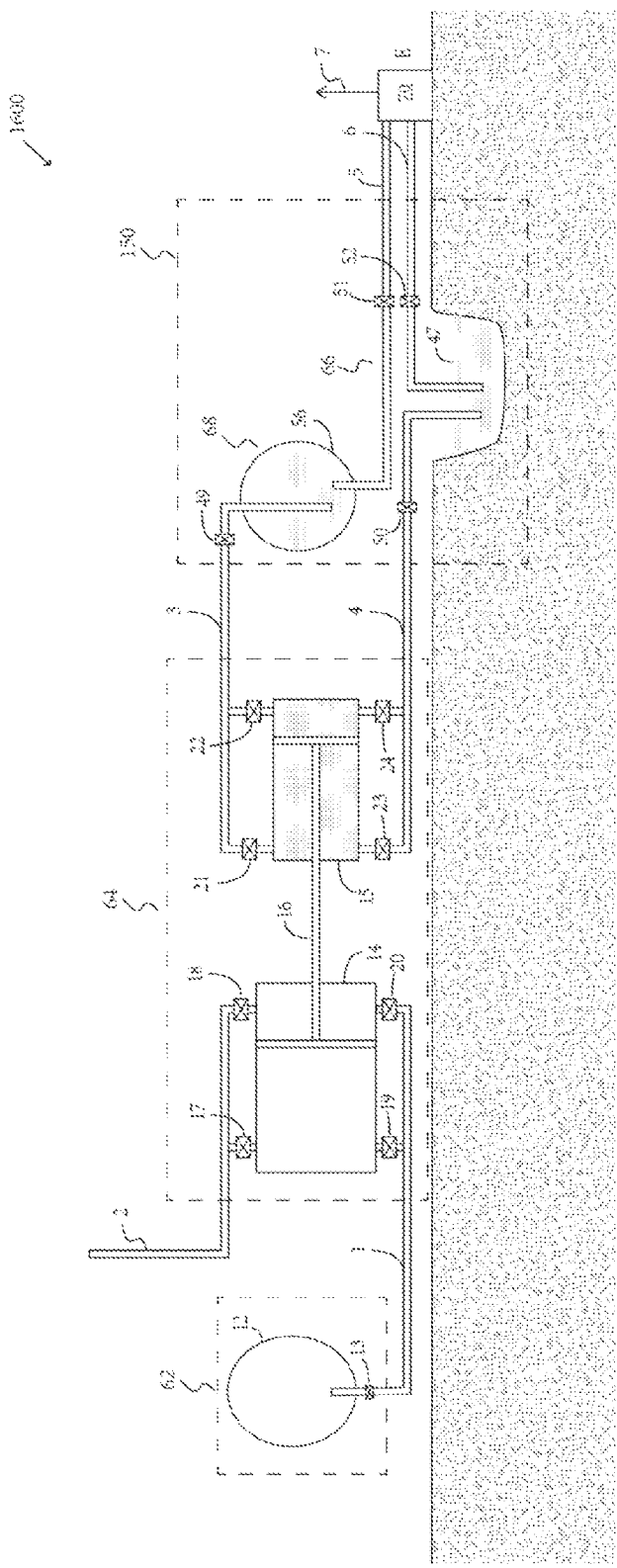
FIG. 16 illustrates a cross sectional view of an exemplary implementation of the high-pressure water apparatus, the low-pressure water apparatus and the gas and water energy exchange unit shown in FIG. 1 in accordance with various embodiments of the present disclosure.

FIG. 16 illustrates a cross sectional view of an exemplary implementation of the high-pressure water apparatus, the low-pressure water apparatus and the gas and water energy exchange unit shown in FIG. 1 in accordance with various embodiments of the present disclosure. The gas and water energy exchange unit 64 shown in FIG. 16 is similar to that shown in FIG. 12. The high-pressure water apparatus 68 and low-pressure water apparatus 66 shown in FIG. 16 are similar to those shown in FIG. 7. The operation principles of the gas and water energy exchange unit and the high-low-pressure tanks have been described above, and hence are not discussed again herein to avoid repetition.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A system comprising:
a high-pressure liquid apparatus;
a low-pressure liquid apparatus coupled to the high-pressure liquid apparatus through two channels, wherein:
a first channel is formed by a pumped hydroelectric power generation unit, a first high-pressure pipe and a first low-pressure pipe; and
a second channel is formed by a gas-water energy exchange unit, a second high-pressure pipe and a second low-pressure pipe, and wherein the high-pressure liquid apparatus and the low-pressure liquid apparatus form a buffer stage coupled between the pumped hydroelectric power generation unit and the gas-water energy exchange unit; and
a compressed gas storage unit coupled to the gas-water energy exchange unit.

2. The system of claim 1, wherein:
the high-pressure liquid apparatus is an upstream reservoir; and
the low-pressure liquid apparatus is a downstream reservoir.

3. The system of claim 1, wherein:
the high-pressure liquid apparatus is a high-pressure water tank; and
the low-pressure liquid apparatus is a low-pressure water tank.

4. The system of claim 1, wherein:
the gas-water energy exchange unit is configured such that potential energy generated by a pressure difference between the high-pressure liquid apparatus and the low-pressure liquid apparatus is converted into pressure potential energy of compressed air stored in the compressed gas storage unit.

5. The system of claim 1, wherein:
the pumped hydroelectric power generation unit comprises a pump and a turbine, and wherein:
the pump is configured to transfer water from the low-pressure liquid apparatus to the high-pressure liquid apparatus; and
the turbine is configured to convert potential energy generated by a pressure difference between the high-pressure liquid apparatus and the low-pressure liquid apparatus into electrical power.

6. The system of claim 1, wherein:
the pumped hydroelectric power generation unit is coupled to a power utility grid.

7. A system comprising:
a compressed gas energy storage unit;
a first energy conversion unit coupled to the compressed gas energy storage unit;
a second energy conversion unit coupled to a power utility grid; and
a buffer stage coupled between the first energy conversion unit and the second energy conversion unit, wherein the buffer stage comprises:
a high-pressure water apparatus; and
a low-pressure water apparatus.

8. The system of claim 7, wherein:
the low-pressure water apparatus is coupled to the high-pressure water apparatus through two channels, and wherein:
a first channel is formed by a pumped hydroelectric power generation unit, a first high-pressure pipe and a first low-pressure pipe; and
a second channel is formed by a gas-water energy exchange unit, a second high-pressure pipe and a second low-pressure pipe.

9. The system of claim 7, wherein:
the first energy conversion unit is a gas-water energy exchange unit comprising:

a first cylinder coupled to the compressed gas energy storage unit through a plurality of first valves; and a second cylinder coupled to the buffer stage through a plurality of second valves, and wherein the first cylinder and the second cylinder are coupled together by a piston rod.

10. The system of claim 7, wherein:
the second energy conversion unit is a pumped hydroelectric power generation unit comprising a pump and a turbine.

11. The system of claim 10, wherein:
the pump is configured to transfer water from the low-pressure water apparatus to the high-pressure water apparatus; and
the turbine is configured to convert potential energy generated by a pressure difference between the high-pressure water apparatus and the low-pressure water apparatus into electrical power.

12. The system of claim 7, wherein:
the high-pressure water apparatus is an upstream reservoir; and
the low-pressure water apparatus is a downstream reservoir, and wherein:
a elevation difference between the upstream reservoir and the downstream reservoir is greater than about 300 m.

13. The system of claim 7, wherein:
the high-pressure water apparatus is a high-pressure water tank with a first pressure level; and
the low-pressure water apparatus is a low-pressure water tank with a second pressure level.

14. The system of claim 13, wherein:
the first pressure level is approximately equal to 3 megapascals; and
the second pressure level is approximately equal to an atmospheric pressure level.

15. A method comprising:
during an energy storage phase, pumping water from a low-pressure water apparatus to a high-pressure water apparatus through a pumped hydroelectric power generation unit and compressing air into a compressed gas storage unit through a gas-water energy exchange unit, wherein water flows from the high-pressure water apparatus to the low-pressure water apparatus; and
during an energy release phase, pumping water from the low-pressure water apparatus to the high-pressure water apparatus through the gas-water energy exchange unit and converting potential energy of the high-pressure water apparatus into electric power through the pumped hydroelectric power generation unit, wherein water flows from the high-pressure water apparatus to the low-pressure water apparatus.

16. The method of claim 15, further comprising:
during the energy storage phase, pumping water from a downstream reservoir to an upstream reservoir through a pump driven by electric power and compressing air into the compressed gas storage unit through the gas-water energy exchange unit, wherein water flows from the upstream reservoir to the downstream reservoir; and
during the energy release phase, pumping water from the downstream reservoir to the upstream reservoir through the gas-water energy exchange unit and converting potential energy of the upstream reservoir into electric power through the pumped hydroelectric power generation unit, wherein water flows from the upstream reservoir to the downstream reservoir.

17. The method of claim 16, wherein:
the upstream reservoir and the downstream reservoir have an elevation difference about 300 m.

18. The method of claim 15, further comprising:
during the energy storage phase, pumping water from a low-pressure water tank to a high-pressure water tank through a pump driven by electric power and compressing air into the compressed gas storage unit through the gas-water energy exchange unit, wherein water flows from the high-pressure water tank to the low-pressure water tank; and
during the energy release phase, pumping water from the low-pressure water tank to the high-pressure water tank through the gas-water energy exchange unit and converting potential energy of the high-pressure water tank into electric power through the pumped hydroelectric power generation unit, wherein water flows from the high-pressure water tank to the low-pressure water tank.

19. The method of claim 18, wherein:
the high-pressure water tank is of a pressure level of about 3 megapascals; and
the low-pressure water tank is of a pressure level approximately equal to an atmospheric pressure level.

* * * * *